US008185935B2

(12) United States Patent
Hsu (10) Patent No.: US 8,185,935 B2
(45) Date of Patent: May 22, 2012

(54) METHOD AND APPARATUS FOR DYNAMIC HOME ADDRESS ASSIGNMENT BY HOME AGENT IN MULTIPLE NETWORK INTERWORKING

(75) Inventor: Raymond T-S Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 862 days.

(21) Appl. No.: 11/452,682

(22) Filed: Jun. 13, 2006

(65) Prior Publication Data

US 2007/0094709 A1    Apr. 26, 2007

Related U.S. Application Data

(60) Provisional application No. 60/690,621, filed on Jun. 14, 2005.

(51) Int. Cl.
*H04L 29/06* (2006.01)

(52) U.S. Cl. ......... 726/3; 726/1; 726/2; 726/14; 726/15; 713/170; 380/270; 380/277

(58) Field of Classification Search ........................ 726/3
See application file for complete search history.

(56) References Cited

U.S. PATENT DOCUMENTS

| 5,708,655 | A | 1/1998 | Toth et al. | |
|---|---|---|---|---|
| 6,845,094 | B1 | 1/2005 | Zhang | |
| 6,856,624 | B2 | 2/2005 | Magret | |
| 7,426,746 | B2 * | 9/2008 | Mononen et al. | 726/4 |
| 7,428,226 | B2 * | 9/2008 | Adrangi et al. | 370/331 |
| 2003/0083045 | A1 | 5/2003 | Blight et al. | |
| 2003/0095523 | A1 | 5/2003 | Korus et al. | |
| 2003/0142650 | A1 * | 7/2003 | Fan | 370/338 |
| 2004/0004967 | A1 | 1/2004 | Nakatsugawa et al. | |
| 2004/0032844 | A1 | 2/2004 | Lewis et al. | |

(Continued)

FOREIGN PATENT DOCUMENTS

EP    1139634 A2    10/2001

(Continued)

OTHER PUBLICATIONS

Chen et al., Dynamic Home Agent Reassignment in Mobile IP, Wireless Communications and Networking Conference 2002, WCNC2002, 2002 IEEE, vol. 1, pp. 44-48.*

(Continued)

*Primary Examiner* — Taghi Arani
*Assistant Examiner* — Narciso Victoria
(74) *Attorney, Agent, or Firm* — Charles E. Eggers (57) ABSTRACT

A method and apparatus for dynamic home address assignment by a home agent in multiple network interworking. The invention provides a method and apparatus send a key authorization request from a mobile station to a network device, the request indicating that the mobile station wishes to use a foreign agent care-of address to continue to receive data. The network device assigns a temporary address to the mobile station and creates a security policy database for the mobile station. The mobile station receives agent advertisements from foreign agents that may be able to provide service. The mobile station registers with a foreign agent. The network device then modifies the security policy database to reflect the information of the foreign agent. The Home Agent then assigns a home address to the mobile station and the network device updates the security policy database to include only the mobile device's home address as a selector.

20 Claims, 5 Drawing Sheets

U.S. PATENT DOCUMENTS

| | | | |
|---|---|---|---|
| 2004/0111461 A1* | 6/2004 | Claudatos et al. | 709/200 |
| 2004/0203749 A1 | 10/2004 | Iyer et al. | |
| 2005/0025164 A1 | 2/2005 | Kavanagh et al. | |
| 2005/0063352 A1* | 3/2005 | Amara et al. | 370/338 |

FOREIGN PATENT DOCUMENTS

| | | | |
|---|---|---|---|
| JP | 2004129210 A | 4/2004 | |
| JP | 2004274521 A | 9/2004 | |
| JP | 2005102269 A | 4/2005 | |
| JP | 2005527145 A | 9/2005 | |
| JP | 2006518965 | 8/2006 | |
| KR | 20030035587 A | 5/2003 | |
| RU | 2003135644 | 5/2005 | |
| WO | WO 0064120 A1 | 10/2000 | |
| WO | WO 03096650 A1 | 11/2003 | |
| WO | WO 2005008964 A1 | 1/2005 | |

OTHER PUBLICATIONS

International Search Report and Written Opinion—PCT/US2006/023211, International Search Authority—European Patent Office—Dec. 3, 2007.

Taiwanese Search report —095121219—TIPO—Apr. 21, 2010.

* cited by examiner

METHOD AND APPARATUS FOR DYNAMIC HOME ADDRESS ASSIGNMENT BY HOME AGENT IN MULTIPLE NETWORK INTERWORKING

CLAIM OF PRIORITY UNDER 35 U.S.C. §119

The present Application for Patent claims priority to Provisional Application No. 60/690,621 entitled "DYNAMIC HOME ADDRESS ASSIGNMENT BY HOME AGENT IN 3G-WLAN INTERWORKING" filed Jun. 14, 2005 and assigned to the assignee hereof and hereby expressly incorporated by reference herein.

I. FIELD OF THE INVENTION

The present invention relates generally to communication systems, and more specifically, to a method and apparatus for dynamic home address assignment by a home agent in multiple network interworking. In addition, the present invention provides an architecture for multiple network interworking.

II. BACKGROUND

Wireless communication technologies have seen tremendous growth in the last few years. This growth has been fueled in part by the freedom of movement offered by wireless technologies and the greatly improved quality of voice and data communications over the wireless medium. Improved quality of voice services along with the addition of data services have had and will continue to have a significant effect on the communicating public. The additional services include accessing the Internet using a mobile device while roaming.

The ability to maintain a data session while moving is important to both users and system operators. As a user moves, the user may change from one network type to another, for example, moving from a Wireless Local Area Network (WLAN) to a Third Generation (3G) Network. Various protocols, such as Mobile Internet Protocol Version 4 (MIPv4) may be used to provide data session continuity as the Mobile Station (MS) moves between WLAN and 3G systems.

Figure 1:
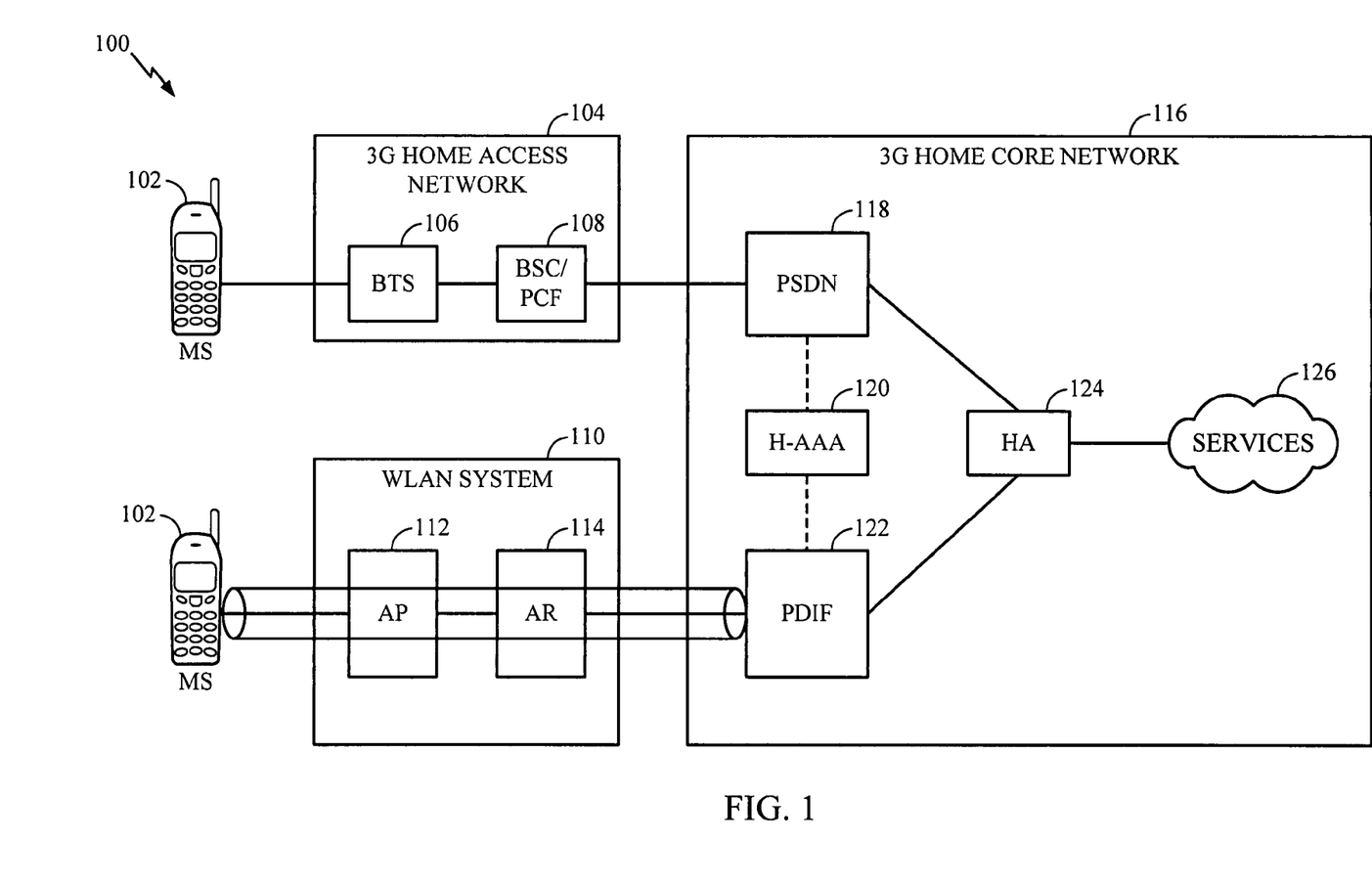
FIG. 1 is a block diagram that shows an interworking architecture for supporting data session continuity between different systems according to an embodiment of the invention.

FIG. 1 shows an interworking architecture for supporting data session continuity between a WLAN system and a 3G system. The architecture, 100, includes multiple MSs, 102, connected to a 3G Home Access Network, 104, or a WLAN system, 110. The 3G Home Access Network includes multiple Base Transceiver Stations (BTSs) although only one BTS is shown in the figure, and multiple Base Station Controller/Packet Control Function devices (BSC/PCF), 108, of which only one is shown. The BTS is connected to the BSC/PCF in the 3G Home Core Network, 116. The WLAN system, 110 includes the Access Point (AP) 112, and Access Router (AR) 114. The WLAN system is also connected to the 3G Home Core Network 116. The 3G Home Access Network 104, connects to the 3G Home Core Network 116 though the Packet Data Services Node (PDSN) 118. The PDSN is connected to the Home Agent (HA) 124 and the Home Authentication, Authorization, and Accounting (H-AAA) device 120. In contrast, the WLAN system connects to the 3G Home Core Network 116 via the Packet Data Interworking Function (PDIF) 122. The PDIF 122 is also connected to the HA 124 and the H-AAA 120.

Mobile IPv4 provides a Foreign Agent Care of Address (FA CoA) mode for intersystem movement. In this mode, the HA serves as the anchored point for user data traffic. When the MS moves into the WLAN or 3G system, the MS registers with the HA. The registration is authenticated and authorized before the HA routes data packets destined for the MS to the WLAN or 3G system where the MS registered. Since the HA is a resource in the home 3G system, it allows only authorized MSs to access the system.

FA CoA operates as the following example describes. Initially, the MS begins a packet data session in the WLAN system 110 and then moves to a 3G system 104. While in the WLAN system the MS establishes an Internet Protocol Security (IPsec) tunnel with the PDIF. After the tunnel is established, the PDIF may act as a FA to advertise its CoA to the MS. The MS registers this CoA with the HA 124. This registration causes the HA to tunnel packets destined for the MS to the PDIF 122, which in turn forwards the packets to the MS. The MS may continue moving and may eventually move out of the WLAN coverage area and into an area served by the 3G network. Once in the 3G network, the MS establishes a Point-to-Point Protocol (PPP) connection with the PDSN 118. After the PPP connection is established, the PDSN 118 may act as a FA to advertise its CoA to the MS. When the MS initiates a MIPv4 session in the WLAN system a Home Address (HoA) should be dynamically assigned by the HA. At present there is a need for a method and apparatus to dynamically assign a HoA by a HA to a MS.

III. SUMMARY

A method comprising the steps of: sending a key authorization request from a mobile device to a network device to request a tunnel inner address; assigning a temporary address to the mobile device; sending the temporary address to the mobile device; creating a security policy database for the mobile device; sending agent advertisements from a foreign agent to the mobile device; sending a registration request from the mobile device to the foreign agent; modifying the security policy database using information contained in the registration request; assigning, by a home agent, a home address to the mobile device; and modifying the security policy database to include only the mobile device home address as a selector.

A method comprising the steps of: sending a key authorization request from a mobile device to a network device to request a tunnel inner address; assigning a temporary address to the mobile device; sending the temporary address to the mobile device; creating a security policy database for the mobile device; sending agent advertisements from a foreign agent to the mobile device; sending a registration request from the mobile device to the foreign agent; modifying the security policy database using information contained in the registration request; assigning, by a home agent, a home address to the mobile device; modifying the security policy database to include only the mobile device home address as a selector; and modifying the security policy database to include a source internet protocol address of an outer tunnel as an additional selector for the mobile device.

An apparatus comprising the elements of: a transmitter for sending a key authorization request from a mobile device to a network device to request a tunnel inner address; a receiver for receiving a temporary address from a network device; a process or creating a security policy database for the mobile device; a transmitter for sending a registration request from the mobile device to a foreign agent; and a receiver for receiving a home address.

An apparatus comprising the following elements: a receiver for receiving a key authorization request from a mobile device; a processor for storing a temporary address; a transmitter for sending a temporary address to a mobile device; and a processor for creating and modifying a security policy database.

An apparatus comprising the following elements: means for sending a key authorization request from a mobile device to a network device to request a tunnel inner address; means for assigning a temporary address to the mobile device; means for sending the temporary address to the mobile device; means for creating a security policy database for the mobile device; means for sending agent advertisements from a foreign agent to the mobile device; means for sending a registration request from the mobile device to the foreign agent; means for modifying the security policy database using information contained in the registration request; means for assigning, by a home agent, a home address to the mobile device; and means for modifying the security policy database to include only the mobile device home address as a selector.

A computer-readable medium including computer executable instructions, to perform the following steps: sending a key authorization request from a mobile device to a network device to request a tunnel inner address; assigning a temporary address to the mobile device; sending the temporary address to the mobile device; creating a security policy database for the mobile device; sending agent advertisements from a foreign agent to the mobile device; sending a registration request from the mobile device to the foreign agent; modifying the security policy database using information contained in the registration request; assigning, by a home agent, a home address to the mobile device; and modifying the security policy database to include only the mobile device home address as a selector.

A computer-readable medium including computer-readable instructions, to perform the following steps: sending a key authorization request from a mobile device to a network device to request a tunnel inner address; assigning a temporary address to the mobile device; sending the temporary address to the mobile device; creating a security policy database for the mobile device; sending agent advertisements from a foreign agent to the mobile device; sending a registration request from the mobile device to the foreign agent; modifying the security policy database using information contained in the registration request; assigning, by a home agent, a home address to the mobile device; modifying the security policy database to include only the mobile device home address as a selector; and modifying the security policy database to include a source internet protocol address of an outer tunnel as an additional selector for the mobile device.

DETAILED DESCRIPTION

The word "exemplary" is used herein to mean "serving as an example, instance, or illustration". Any embodiment described herein as "exemplary" is not necessarily to be construed as preferred or advantageous over other embodiments.

MIPv4 allows the transparent routing of IP datagrams to mobile nodes in the Internet. Each mobile node is always identified by its home address, regardless of its current point of Internet attachment. While away from its home, a mobile node is also associated with a Care-of Address (CoA), which provides information about the mobile node's current Internet attachment point. MIPv4 provides mechanisms and procedures for registering the CoA with a HA. The HA sends datagrams destined for the mobile node through a tunnel to the CoA. After passing through the tunnel the datagrams are delivered to the mobile node.

MIPv4 assumes that a mobile node's IP address uniquely identifies the mobile node's point of attachment to the Internet. A mobile node must be located on the network identified by its IP address in order to receive datagrams destined to it; otherwise the datagrams are undeliverable. A mobile node may use one of the following mechanisms to maintain it's point of attachment without losing the ability to communicate. The first method requires that the mobile node must change it's IP address whenever it changes it's point of attachment to the Internet. Alternatively, the mobile node must use host-specific routes which are propagated throughout much of the Internet routing fabric. Both of these options may prove unacceptable. Changing an IP address repeatedly may make it impossible for a mobile node to maintain transport and higher layer connections as the mobile node changes location. The second method may cause severe scaling difficulties. MIPv4 is a protocol for accommodating mobile node mobility within the Internet.

Mobile Internet Protocols introduce new functional entities as described below.

A Mobile Node is a host or router that changes its point of attachment from one network or subnetwork to another. A mobile node may change its locations without changing it IP address, allowing it to continue to communicate with other Internet nodes at any location using its constant IP address, provided that link layer connectivity to a point of attachment is available.

A Home Agent is a router on a mobile node's home network which tunnels datagrams for delivery to the mobile node when it is away from home and maintains current location information for the mobile node.

A Foreign Agent is a router on a mobile node's visited network which provides routing services to the mobile node while registered. The foreign agent detunnels and delivers datagrams to the mobile node that were tunneled by the mobile node's home agent. The foreign agent may serve as a default router for registered mobile nodes for datagrams sent by a mobile node.

A mobile node is given a long term IP address on a home network. This home address is administered like a "permanent" IP address for a stationary host. When the mobile node is away from its home network, a Care-of Address (CoA) is associated with the mobile node and reflects the mobile node's current point of attachment to the Internet. The mobile node uses its home address as the source address of all IP datagrams it sends, excepting only certain mobility management function datagrams that are independent of the present invention.

Mobile IPv4 uses a number of terms that should be defined before reviewing the operation of the protocol. These terms are defined below.

An Agent Advertisement is an advertisement message constructed by attaching a special extension to a router advertisement message.

Authentication is the process of using cryptographic techniques to verify the identity of the originator of a message.

A Care-of Address is the termination point of a tunnel toward a mobile node for datagrams forwarded to the mobile node while it is away from its home network. The protocol may use two different types of Care-of address: a Foreign Agent Care-of Address which is an address of a foreign agent that the mobile node is registered with, and a co-located care-of address which is an externally obtained local address which the mobile node has associated with one of its own network interfaces.

A Home Address is an IP address that is assigned for an extended period of time to a mobile node. It remains unchanged regardless of where the mobile node is attached to the Internet.

A Home Network is a network having a network prefix matching that of a mobile node's home address. Standard IP routing mechanisms will deliver datatgrams destined to a mobile node's Home Address to the mobile node's Home Network.

A Tunnel is the path followed by a datagram while it is encapsulated. While encapsulated a datagram is routed to a knowledgeable decapsulating agent which decapsulates the datagram and then delivers it correctly to its final destination.

A Virtual Network is a network with no physical instantiation beyond a router having a physical network interface on another network. The router or HA generally advertises reachability to the virtual network using conventional routing protocols.

A Visited Network is a network other than a mobile node's Home Network that the mobile node is currently connected to.

Mobile IP provides the support services listed below.

Agent Discovery occurs when home agents and foreign agents advertise their availability on each link for which they provide service. A newly arrived mobile node may send a solicitation on the link to ascertain if any prospective agents are present.

Registration occurs when the mobile node is away from the home network. A mobile node away from its home network registers its care-of address with its home agent. Depending the on the mode of attachment to the Internet, the mobile node will register either directly with its home agent or through a foreign agent which forwards the registration to the home agent.

The following steps provide a general outline of the operation of the Mobile IP protocol. Mobility agents, that is, foreign agents and home agents advertise their presence using Agent Advertisement messages. A mobile node may also solicit an Agent Advertisement message from any locally attached mobility agent using an Agent Solicitation message. A mobile node receives the Agent Advertisements and determines whether it is on it home network or a foreign network.

If the mobile detects that it is on the home network, it operates without using mobility services. If the mobile node is returning to the home network after being registered elsewhere, the mobile node first deregisters with the home agent, using a Registration Request and receiving a Registration Reply message.

If the mobile detects that it has moved from the home network to a foreign network, the mobile obtains a care-of address on the foreign network. The care-of address may either be determined from the foreign agent's advertisements (a foreign care-of address), or by an external assignment mechanism (a co-located care-of address). The mobile node operating away from the home network then registers the new care-of address with the home agent through the exchange of a Registration Request message and a Registration Reply message. After this occurs, datagrams sent to the mobile node's home address are intercepted by the home agent, tunneled by the home agent to the mobile node's care-of address, received at the tunnel endpoint (either at a foreign agent or at the mobile node itself), and finally, delivered to the mobile node. In the reverse direction, datagrams sent by the mobile node are generally delivered to their destination using standard IP routing mechanisms and may not necessarily pass through the home agent.

When away from the home network, mobile IP uses protocol tunneling to hide a mobile node's home address from intervening routers between the home network and the current location of the mobile node. The tunnel terminates at the mobile node's care-of address. The care-of address must be an address to which datagrams may be delivered via conventional IP routing. At the care-of address the original datagram is removed from the tunnel and delivered to the mobile node.

Mobile IPv4 provides two mechanisms for acquiring a care-of address. In the first mechanism, a foreign agent care-of address is a care-of address provided by a foreign agent through Agent Advertisement messages. In this mechanism, the care-of address is an IP address of the foreign agent. When the foreign agent receives the tunneled datagrams it decapsulates them and delivers the inner datagram to the mobile node. This mechanism is preferred because it allows many mobile nodes to share the same care-of address and does not place unnecessary demands on the limited address space.

The second mechanism provides a co-located care-of address. This co-located care-of address is acquired by the mobile node as a local IP address through some external means. The mobile node then associates the co-located care-of address with one of its own network interfaces. The co-located care-of address may be dynamically acquired as a temporary address by the mobile node or may be owned by the mobile node as a long term address for use only while visiting a foreign network. When using a co-located care-of address, the mobile node serves as the endpoint of the tunnel and performs the decapsulation of the datagrams tunneled to the address. This mechanism has the advantage of allowing a mobile node to function without a foreign agent. It may burden IPv4 address space since it requires a pool of addresses within the foreign network to make available to visiting mobile nodes.

The care-of address is distinct from the foreign agent functions. The care-of address is the endpoint of the tunnel. It may be the address of a foreign agent, but it may also be an address temporarily acquired by the mobile node (a co-located care-of address). A foreign agent is a mobility agent that provides services to the mobile nodes.

Figure 2:
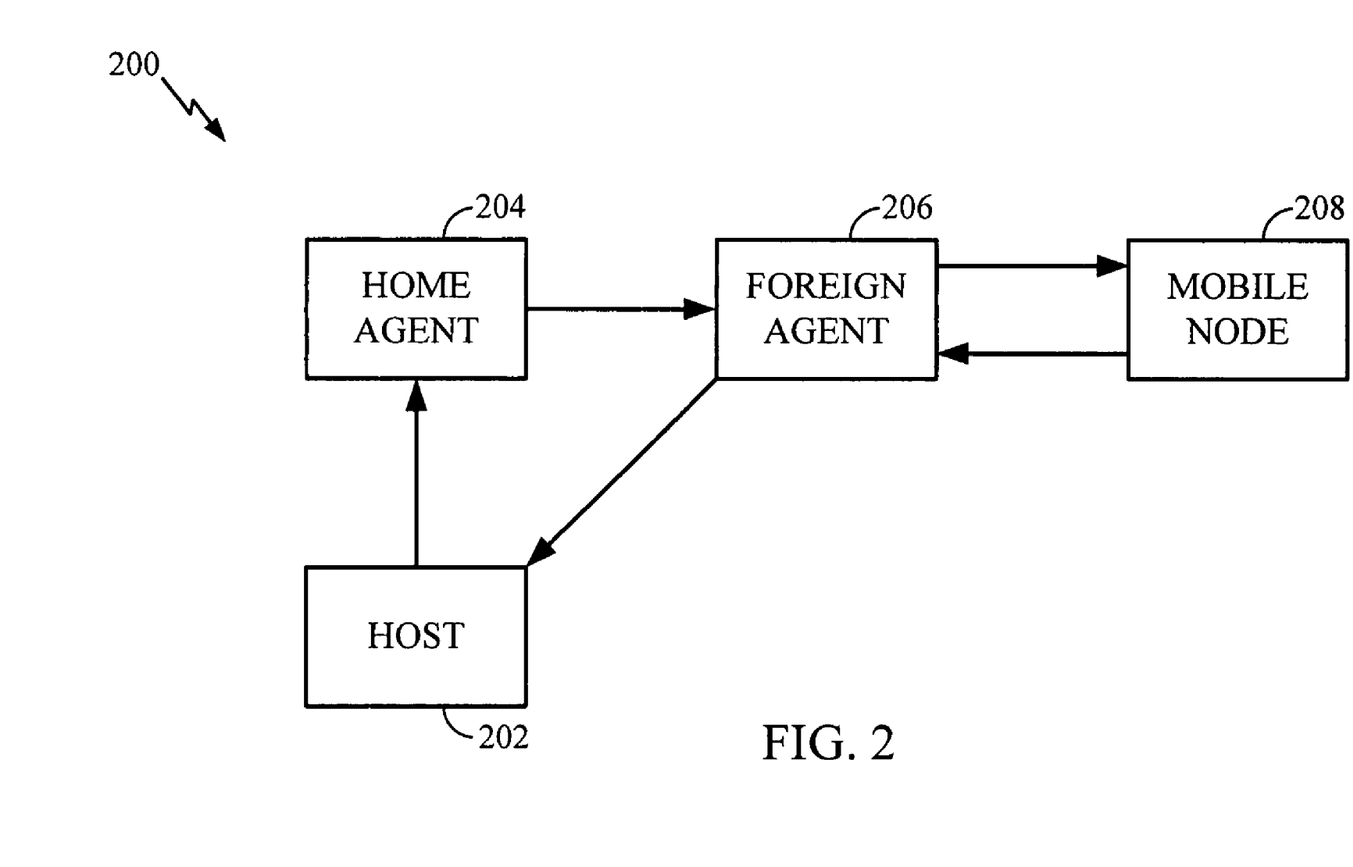
FIG. 2 shows the operation of Mobile IPv4 according to an embodiment of the invention.

FIG. 2 shows the routing of datagrams to and from a mobile node away from its home network, after the mobile node registers with the home agent. The method, 200, illustrates the mobile node using a foreign agent care-of address. A datagram for the mobile node arrives at the host 202 on the home network using standard IP routing. The home agent 204 intercepts the datagram and tunnels the datagram to the care-of address. The foreign agent 206, detunnels the datagram and delivers the datagram to the mobile node 208 for datagrams sent by the mobile node, standard IP routing delivers each datagram to the specified destination. In FIG. 2, The foreign agent is the mobile node's default router.

A home agent must be able to attract and intercept datagrams that are addressed to the home address of any of its registered mobile nodes. This requirement may be satisfied if the home agent has a network interface on the link indicated by the mobile node's home address. Other placements of the home agent relative to the mobile node may also be possible, however, other methods for intercepting the datagrams addressed to the mobile node's home address may be needed.

A mobile node and a current or prospective foreign agent must be able to exchange datagrams without relying on standard IP routing mechanisms, specifically those mechanisms that make forwarding decisions based upon the network prefix of the destination address in the IP header. This may be achieved if the foreign agent and the visiting mobile node have an interface on the same link. In this case, the mobile node and the foreign agent simply bypass the normal IP routing mechanism when sending datagrams to one another, addressing the underlying link-layer packets to their respective link layer addresses.

If a mobile node is using a co-located care-of address the mobile node should be on the link identified by the network prefix of that care-of address. If not, datagrams will be undeliverable.

A mobile node moving from one network to another needs a flexible mechanism to communicate how it may be reached. This is accomplished in Mobile IP using registration. Registration is the method by which mobile nodes request forwarding services when visiting a foreign network, inform their home agent of the current care-of address, renew a registration which is about to expire, and deregister when the mobile node returns home. Registration messages exchange information between a mobile node, a foreign agent, and the home agent. The registration process creates or modifies a mobility that is binding at the home agent, associating the mobile node's home address with its care-of address for a specified period of time.

Mobile IP offers two different registration procedures, one via a foreign agent that relays the information to the mobile node's home agent, and another registering directly with the mobile node's home agent. Rules define which procedure should be used depending on the circumstances. Either registration procedure is compatible with the method and apparatus of the present invention.

Registration procedures provide authentication and some security and tunneling also provides security. Nevertheless, additional security is needed to protect datagrams while in transit through multiple networks. Mobile IPv4 is used in conjunction with a key exchange protocol known as Internet Key Exchange Version 2, IKEv2. IKEv2 is a component of IP Security (IPsec) used for performing mutual authentication and establishing and maintaining security associations. IPsec provides confidentiality, data integrity, access control, and data source authentication to IP datagrams. These services are provided by maintaining a shared state between the source and the sink of an IP datagram. This state defines the specific services provided to the datagram, which cryptographic algorithm will be used, and the keys used as input to the cryptographic algorithms. IKEv2 allows this state to be established dynamically.

All IKEv2 communications are comprised of pairs of messages: a request and a response. The pair is known as an exchange. A request is followed by a response. It is the responsibility of the requester to ensure reliability. If the response is not received within a timeout interval, the requester must retransmit the request or abandon the connection. The first exchange negotiates security parameters for the security association. The second request transmits identities, proves knowledge of the secrets corresponding to the two identities, and sets up the security association.

Figure 3:
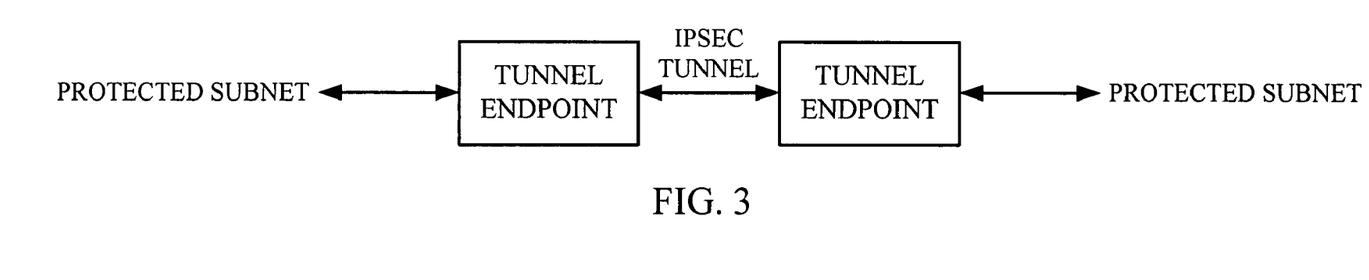
FIG. 3 shows a security gateway to security gateway tunnel according to an embodiment of the invention.

IKE may be used in a number of different scenarios, each of which has special requirements. IKE may be used with a security gateway to a security tunnel. FIG. 3 shows a block diagram of this scenario. In this scenario, neither endpoint of the IP connection implements IPsec, however, network nodes between them protect traffic for part of the routing. Protection is transparent to the endpoints and relies upon ordinary routing to send packets through the tunnel endpoints for processing. Each endpoint announces the set of address "behind" it, and packets would be sent in tunnel mode where the inner IP header contains the IP address of the actual endpoint.

Figure 4:
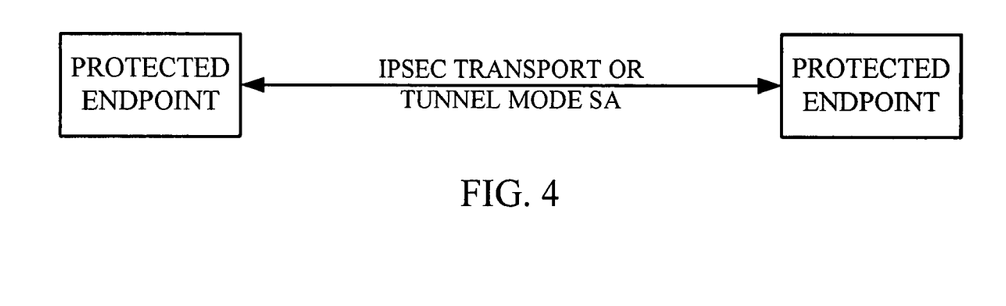
FIG. 4 shows an endpoint to endpoint transport according to an embodiment of the invention.

FIG. 4 shows a scenario where both endpoints of the IP connection implement IPsec, or endpoint to endpoint. Transport mode is used with no inner IP header. If an inner IP header is present the inner and outer addresses are the same. A single pair of addresses is negotiated for packets to be protected by this security association. These endpoints may implement application layer access controls based on the IPsec authenticated identities of the participants. One advantage of this scenario is that it provides end-to-end security.

Figure 5:
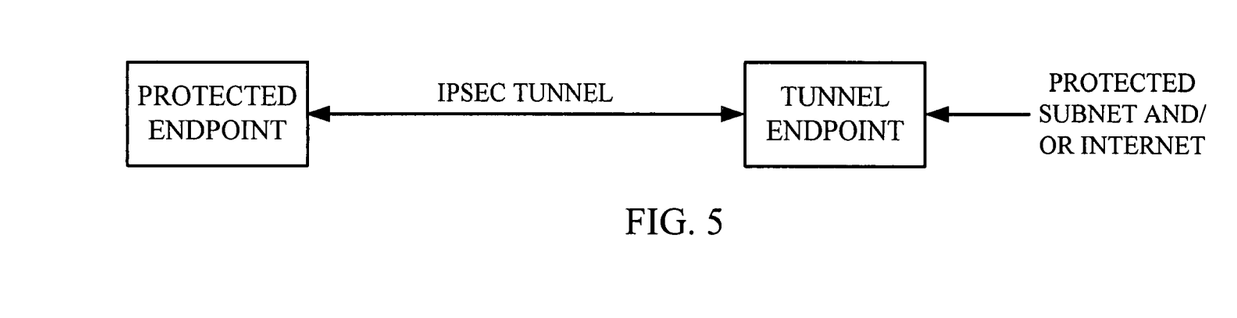
FIG. 5 shows an endpoint to security gateway tunnel transport according to an embodiment of the invention.

FIG. 5 shows a block diagram of the endpoint to security gateway tunnel scenario. In this scenario, a protected endpoint (typically a portable roaming device) connects back to its corporate network through an IPsec protected tunnel. The device, or mobile node may use this tunnel only to access information on the corporate network, or it may tunnel all of its traffic back through the corporate network to take advantage of protection offered by a corporate firewall. In either case, the protected endpoint will want to have an IP address associated with the security gateway so that packets returned to it will go to the security gateway and be tunneled back. This IP address may be static or may be dynamically allocated by the security gateway. To support dynamic allocation IKEv2 includes a mechanism for the initiator to request an IP address owned by the security gateway for use for the duration of the security allocation.

In this scenario, packets use the tunnel mode. On each packet from the protected endpoint, the outer IP header contains the source IP address associated with the current location (i.e., the address that routes traffic directly to the endpoint), while the inner IP header contains the source IP address assigned by the security gateway (i.e., the address that forwards traffic to the security gateway for forwarding to the endpoint). The outer destination address will be that of the security gateway, while the inner destination address will be the ultimate destination for the packet. The present invention may be used with any of these scenarios, but is well suited to operating in conjunction with a tunnel.

Mobile IPv4 and IKEv2 were described above in relation to a 3G system. The present invention bridges the problems found when a mobile node moves from the 3G system to a WLAN. An overview of a WLAN network in the context of cdma2000 IP data connectivity will be presented.

FIG. 1 shows a portion of a WLAN network designed to interface with a 3G Home Core Network. The functions in the 3G Home Core Network that interface with the WLAN entities include the PIDF and the HA.

The PDIF is the Packet Date Interworking Function, which acts as a security gateway protecting resources and packet data services in a serving cdma2000 network from unauthorized access. The PDIF 122 is located in the serving network, in this case, the 3G Home Core Network. The HA 124, or Home Agent is also located in the 3G Home Core Network. The PDIF 122 provides access to packet data services by providing IP connectivity to the 3G Home Core Network and other external networks. It supports secure tunnel management procedures between itself and mobile nodes or mobile stations (MS), including establishment and release of the tunnel, allocation of an IP address to the MS from the serving network, and encapsulation and de-capsulation of traffic to and from the MS or mobile node. It also enforces serving network policies such as packet filtering and routing. Through the interface to the H-AAA 120, the PDIF 122 supports user authentication and transfer of authorization policy information. In addition, the PDIF 122 collects and reports accounting information.

As discussed above, a tunnel is a secure means of transferring datagrams through the Internet. A tunnel is established using the procedures described below.

Figure 6:
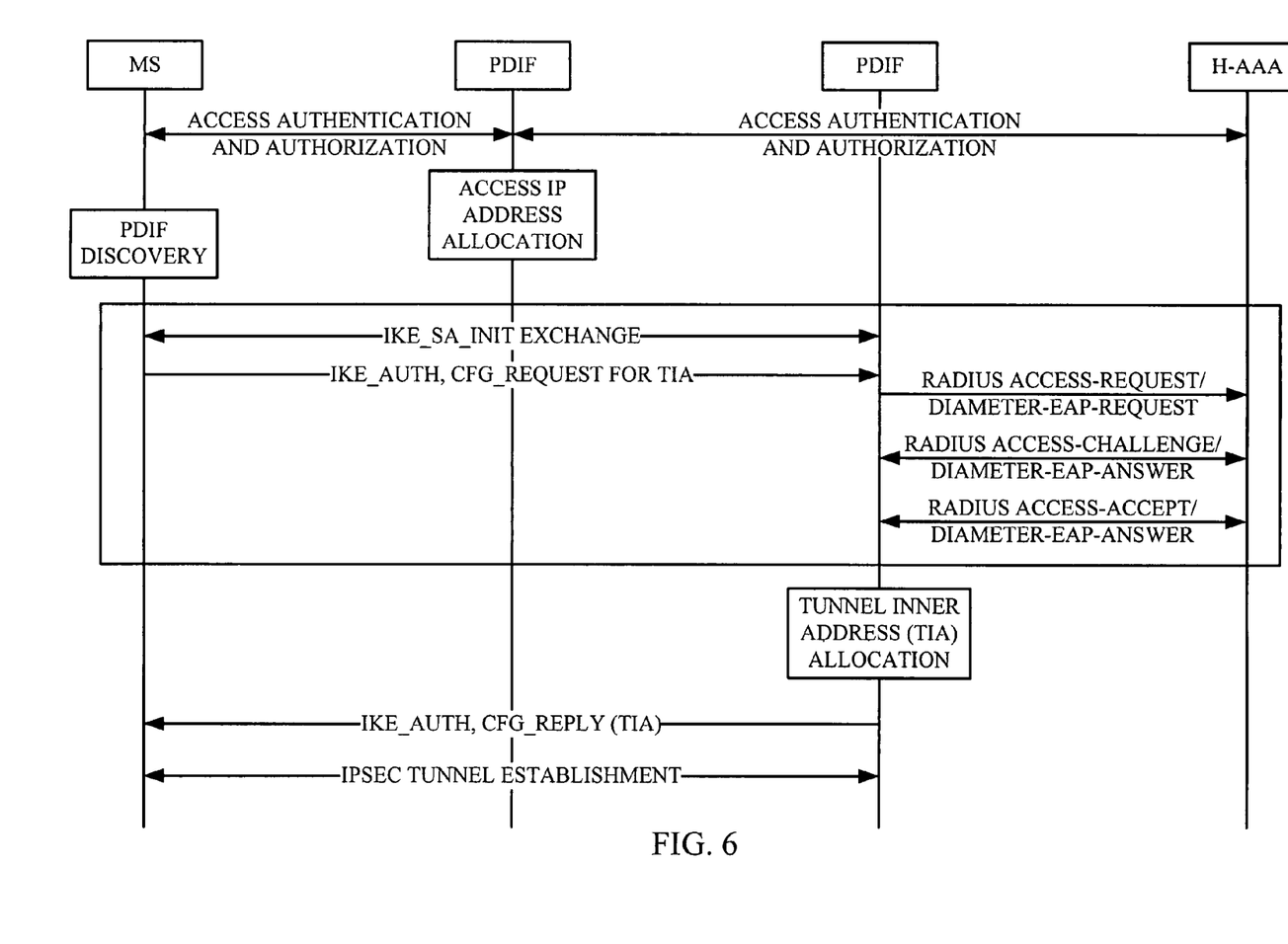
FIG. 6 shows the tunnel establishment flow according to an embodiment of the invention.

FIG. 6 shows the flow of messages in the tunnel establishment procedure. To begin establishing a tunnel, the MS or mobile node, authenticates to the WLAN Access Network and receives Internet Access. This may include the WLAN Access Network checking with the H-AAA for authorization. The MS or mobile node configures an IP address from the Access Network and discovers the default router and servers.

The MS or mobile node then performs PDIF discovery. The PDIF IP address is a global, publicly routable IP address.

The MS or mobile node then initiates an IKEv2 exchange with the PDIF. The first set of messages are the exchanges needed to exchange the keys. These exchanges also support the negotiation of datagram port encapsulation.

The MS or mobile node next initiates the key exchange authorization with the PIDF. These messages are encrypted and protecting using the keys negotiated in the previous steps. The MS or mobile node then requests a tunnel inner IP address (TIA). The MS or mobile node includes its Network Access Identifier (NAI) in the payload in the service authorization request.

The PDIF receives the IKE authorization request and contacts the H-AAA to request service authorization and user authentication. The H-AAA authenticates the subscriber and forwards the authentication information back to the PDIF. The PDIF completes the IKE authorization exchange by sending an authorization message to the MS or mobile node. Once this IKE authorization is complete an IPsec tunnel is established between the MS or mobile node and the PDIF.

Figure 7:
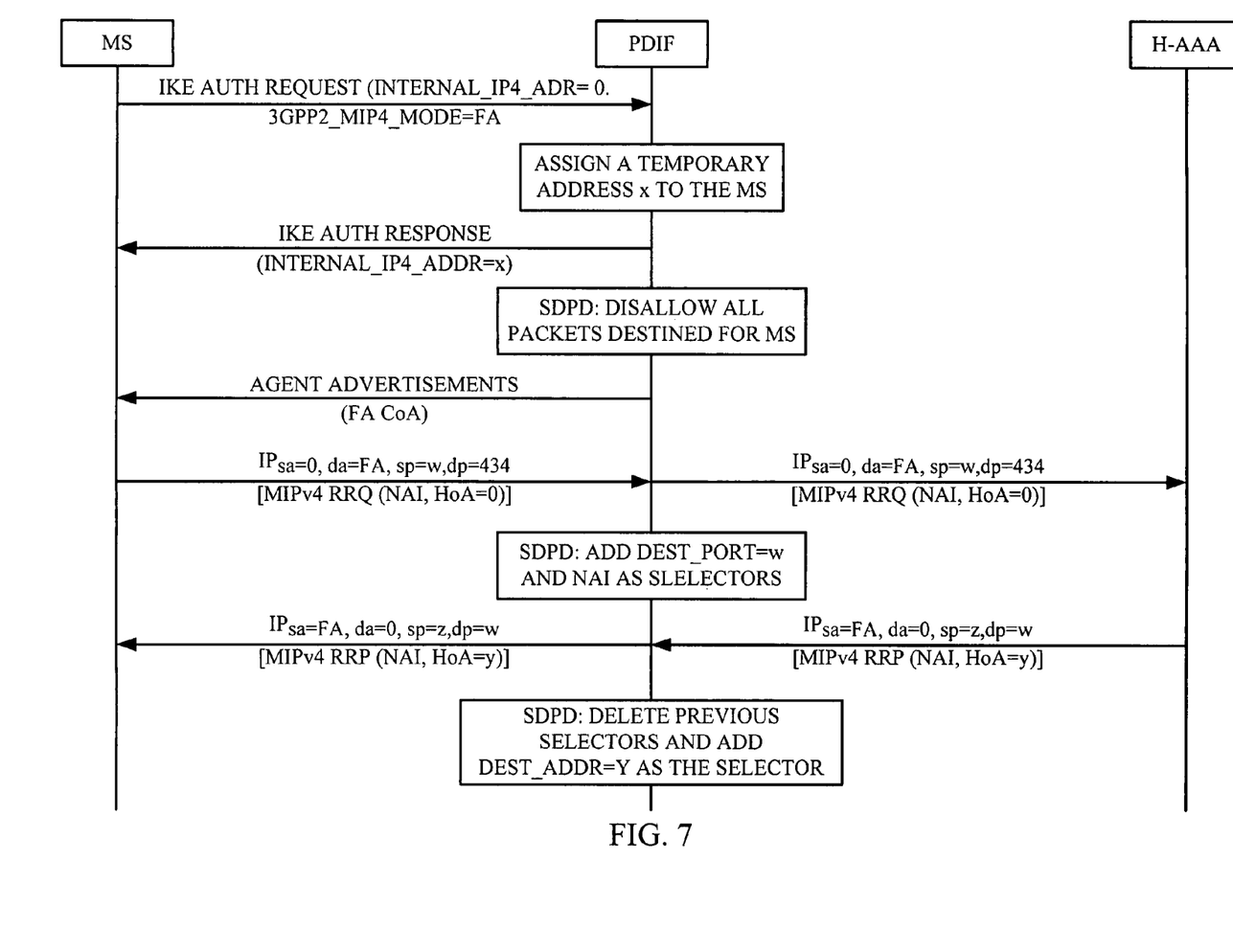
FIG. 7 is a flow diagram depicting dynamic home address assignment by a home agent, according to an embodiment of the invention.

FIG. 7 is a flow diagram of dynamic home address assignment by a home agent in 3G-WLAN interworking. In FIG. 7, the numbers on the left hand side (e.g., 1, 2, 3, etc.) generally refer to steps in the method of dynamic home address assignment by a home agent in a 3G-WLAN interworking architecture according to an embodiment of the invention. In step 1 a TIA is required, as discussed above, for IKEv2 operation when using the tunnel mode. Because of this requirement, the MS or mobile node, set Internal$_{13}$ IP4$_{13}$ Address to zero to signal to the PDIF to assign a TIA to the MS. The MS also includes a 3GPP2-specific parameter indicating that the MS wants to use the MIPV4 FA CoA operation, discussed above.

In step 2 the PDIF assigns a temporary address, x, to the MS. This address will be recovered later, after step 9.

At step 3, the PDIF conveys the temporary address x to the MS in the IKE Authorization Response message.

At step 4, the PDIF creates a Security Policy Database (SPD) for the MS. At this point in the method, the policy of the SPD is to disallow all packets destined for temporary address x.

In step 5, because the MS has indicated that it will be using MIPv4 FA CoA operation, the PDIF sends Agent Advertisements to the MS on a periodic basis. The Agent Advertisements contain the FA CoA.

In step 6, the MS sends an MIPv4 Registration Request (RRQ) to the FA. The source and destination IP addresses are 0.0.0.0 and the FA CoA, respectively. The source and destination port numbers are w (selected by the MS), and 434 (a well-known port for MIPv4 registration), respectively. The RRQ contains the MS's NAI and the Home Address (HoA) fields set equal to 0.0.0.0. in order to signal a request for the HA to assign a HoA.

In step 7, the PIDF changes the SPD by adding destination port w and the MS's NAI as the selectors. This means that the PDIF will associate only MIPv4 Registration Reply (RRP) destined for the MS with the IPsec tunnel from the PDIF to the MS. This allows the PDIF to send the RRP to the correct IPsec tunnel.

At step 8, the HA assigns a HoA, y, and responds with an RRP that also contains the MS's NAI. The source and destination IP addresses are HA and CoA respectively. The source and destination port numbers are z (selected by the HA) and w, respectively.

In step 9, the PDIF changes the SPD by including only the destination address y (i.e., the MS's HoA) as the selector. This means that the PDIF will associate subsequent IP packets destined for the MS with the IPsec tunnel from the PDIF to the MS. This allows the PDIF to send the packets to the correct IPsec tunnel.

An additional embodiment allows for private addressing support. That is, each HA may assign private addresses and manage its own private address space. In this embodiment, it is possible for two HAs to assign the same private address to different MSs served by the same PDIF. In this situation, the two packets intended for the two MSs have the same destination IP address, so the PDIF must determine the appropriate IPsec tunnel for each packet. Each IP packet destined for a MS arrives at the PDIF from the MS's HA via the IP-IP encapsulation. In this situation, the outer packet's source and destination addresses are the HA's IP address and the FA's IP address, respectively. The inner packet's source and destination addresses are the MS's IP address and a correspondence node's IP address, respectively. Although the two MSs have the same private address, they have different HA IP addresses that are globally routable, because the two MSs are served by different Has.

In a further embodiment, the PDIF includes the source IP address of the outer tunnel, which is the HA's IP address, as an additional selector in the SPD for the MS. This changes step 9 of the method described above. Step 9 in this embodiment requires the PDIF to discover the assigned HoA (i.e., y) in the RRP (see step 8) is a private address. The PDIF then adds the source IP address of the outer tunnel, which is set equal to the MS's HA IP address, as an additional selector in the SPD for the MS.

In further embodiments, those skilled in the art will appreciate that the foregoing methods can be implemented by the execution of a program embodied on a computer readable medium, such are the memory of a computer platform. The instructions can reside in various types of signal-bearing or data storage primary, secondary, or tertiary media. The media may comprise, for example, RAM accessible by, or residing within, the client device and/or server. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM or EEPROM), flash memory cars, an optical storage device (e.g., CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. The activities or steps of the method claims in accordance with the embodiments of the invention described herein need not be performed in any particular order. Furthermore, although elements of the invention may be described or claimed in the singular, the plural is contemplated unless limitation to the singular is explicitly stated.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method for dynamic home address assignment in communication systems, the method comprising:
   sending a key authorization request from a mobile device to a network device to request a tunnel inner address;
   assigning a temporary address to the mobile device;
   sending the temporary address to the mobile device;
   creating a security policy database for the mobile device with a policy to disallow packets destined for the temporary address;
   sending agent advertisements from a foreign agent to the mobile device in response to the key authorization request;
   sending a registration request from the mobile device to the foreign agent;
   modifying the security policy database using information contained in the registration request;
   assigning a home address to the mobile device, wherein the home address is received from a home agent; and
   modifying the security policy database to delete previous selectors and to include only the home address as a selector.

2. The method of claim 1, wherein sending the key authorization request includes setting an internal internet protocol address to zero.

3. The method of claim 1, wherein sending the key authorization request includes including a parameter indicating that the mobile device will use a foreign agent care-of address.

4. The method of claim 1, wherein sending the key authorization request includes setting an internal internet protocol address to zero and including a parameter indicating that the mobile device will use a foreign agent care-of address.

5. The method of claim 1, wherein the registration request includes a source internet protocol address and a destination internet protocol address.

6. The method of claim 5, wherein the registration request includes a source internet protocol address, a destination internet protocol address, a source port number, a destination port number, and a network access identifier.

7. The method of claim 1, further comprising modifying the security policy database to include a source internet protocol address of an outer tunnel as an additional selector for the mobile device.

8. An apparatus for use in communication systems, the apparatus comprising:
   a transmitter for sending a key authorization request from a mobile device to a network device to request a tunnel inner address;
   a receiver for receiving a temporary address from the network device;
   a processor for creating a security policy database for the mobile device with a policy to disallow packets destined for the temporary address, and subsequently modifying the security policy database to delete previous selectors and to include the home address as a selector, and a source internet protocol address of an outer tunnel as an additional selector;
   a transmitter for sending a registration request from the mobile device to a foreign agent; and
   a receiver for receiving a home address for the mobile device from a home agent.

9. The apparatus of claim 8, wherein the key authorization request includes an internal internet protocol address set to zero.

10. The apparatus of claim 8, wherein the key authorization request includes a parameter indicating that the mobile device will use a foreign agent care-of address.

11. The apparatus of claim 8, wherein the key authorization request includes an internal internet protocol address set to zero and a parameter indicating that the mobile device will use a foreign agent care-of address.

12. The apparatus of claim 8, wherein the registration request includes a source internet protocol address and a destination internet protocol address.

13. The apparatus of claim 8, wherein the registration request includes a source internet protocol address, a destination internet protocol address, a source port number, a destination port number, and a network access identifier.

14. An apparatus for use in communication systems, the apparatus comprising:
   means for sending a key authorization request from a mobile device to a network device to request a tunnel inner address;
   means for assigning a temporary address to the mobile device;
   means for sending the temporary address to the mobile device;
   means for creating a security policy database for the mobile device with a policy to disallow packets destined for the temporary address;
   means for sending agent advertisements from a foreign agent to the mobile device in response to the key authorization request;
   means for sending a registration request from the mobile device to the foreign agent;
   means for modifying the security policy database using information contained in the registration request;
   means for assigning a home address to the mobile device, wherein the home address is received from a home agent; and
   means for modifying the security policy database to delete previous selectors and to include only the home address as a selector.

15. The apparatus of claim 14, wherein the means for sending the key authorization request include means for setting an internal internet protocol address to zero.

16. The apparatus of claim 14, wherein the means for sending the key authorization request include means for sending a parameter indicating that the mobile device will use a foreign agent care-of address.

17. The apparatus of claim 14, wherein the means for sending the key authorization request include means for setting an internal internet protocol address to zero and including a parameter indicating that the mobile device will use a foreign agent care-of address.

18. The apparatus of claim 14, wherein the registration request includes a source internet protocol address and a destination internet protocol address.

19. The apparatus of claim 14, wherein the registration request includes a source internet protocol address, a destination internet protocol address, a source port number, a destination port number, and a network access identifier.

20. A non-transitory computer-readable medium including computer executable instructions, comprising:

sending a key authorization request from a mobile device to a network device to request a tunnel inner address;

assigning a temporary address to the mobile device;

sending the temporary address to the mobile device;

creating a security policy database for the mobile device with a policy to disallow packets destined for the temporary address;

sending agent advertisements from a foreign agent to the mobile device in response to the key authorization request;

sending a registration request from the mobile device to the foreign agent;

modifying the security policy database using information contained in the registration request;

assigning a home address to the mobile device, wherein the home address is received from a home agent; and     modifying the security policy database to delete previous selectors and to include only the home address as a selector.

\* \* \* \* \*